(12) United States Patent
Schroder et al.

(10) Patent No.: US 6,958,918 B2
(45) Date of Patent: Oct. 25, 2005

(54) CONTACT UNIT

(75) Inventors: Thomas Schroder, Berlin (DE); Marc-Anton Munich, Gross Glienicke (DE); Peter Nitsch, Berlin (DE); Michael Glasser, Berlin (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/984,799

(22) Filed: Nov. 10, 2004

(65) Prior Publication Data

US 2005/0106928 A1    May 19, 2005

(30) Foreign Application Priority Data

Nov. 15, 2003  (DE)  ................................ 103 53 432

(51) Int. Cl.$^7$ .............................................. H01R 9/00
(52) U.S. Cl. .................... 361/823; 361/637; 439/34; 310/239
(58) Field of Search ................. 361/822–824, 361/601–602, 636–637; 439/34–35; 310/88–90, 310/239–240; 123/73 A, 73 PP

(56) References Cited

U.S. PATENT DOCUMENTS

| | | | | |
|---|---|---|---|---|
| 4,601,274 A | * | 7/1986 | Seilly | 123/450 |
| 5,440,186 A | * | 8/1995 | Forsell et al. | 310/239 |
| 5,460,035 A | * | 10/1995 | Pfaffenberger | 73/118.1 |
| 5,528,093 A | * | 6/1996 | Adam et al. | 310/89 |
| 5,868,114 A | * | 2/1999 | Kamimura et al. | 123/399 |
| 6,259,184 B1 | * | 7/2001 | Bender | 310/239 |

FOREIGN PATENT DOCUMENTS

DE    19644169 A1    4/1998

* cited by examiner

Primary Examiner—Kamand Cuneo
Assistant Examiner—Tuan Dinh
(74) Attorney, Agent, or Firm—Griffin & Szipl, P.C.

(57) ABSTRACT

A contact unit described includes a contact plate and a connection plug 4 for an adjusting device. A position sensor is disposed on the contact plate whose electrical contact results over conductor tracks 13 molded into the contact plate. The contact plate 8 further includes contact flags 12 for contacting an electromotor, wherein the contact flags 12 are led outside to a plug 4 over conductor tracks that are injected into the contact plate 8. All conductor tracks are led in a fixed position with respect to one another in a plug inner portion 14, wherein this plug inner portion is produced in one injection process with the contact plate 8, and connection between the contact plate 8 and the plug inner portion results only through the conductor tracks 13.

6 Claims, 3 Drawing Sheets

CONTACT UNIT

This application claims priority from German Patent Application No. 10353432.6, filed Nov. 15, 2003, the entire disclosure of which is incorporated herein by reference.

FIELD OF THE INVENTION

The present invention relates to a contact unit, preferably for a throttle flap support for an internal combustion engine, having a contact plate that is fixed in a housing of the throttle flap support having bore holes for receiving a throttle flap shaft and a drive shaft that are operatively connected by means of a set of gears, and that comprises tracks, and that is disposed in a space or delineates a space on one side, and that is sealed by a cover, wherein the contact tracks form an electrical connection between the contact flags of a drive unit and a connection plug, as well as an electrical connection between the connection contacts of a position sensor and the connection plug, wherein the connection plug is formed in two parts comprising an inner portion and an outer portion, wherein the inner portion extends through an opening of a cover of the throttle flap support, and having a flange surface that is adjacent the limiting inner wall of the cover or the housing and is fixed in this position by the outer portion of the plug that is plugged onto the outside of the space.

BACKGROUND OF THE INVENTION

Carrier plates, such as the device taught by DE 19644169A1, are known. The carrier plate described in DE 19644169A1 performs the function of a contact unit, is fastened to the throttle flap and connects the connection plug by means of its electrically conducting regions with a drive unit. In this manner track regions of a throttle flap potentiometer can be disposed on the carrier plate to determine the position of the throttle flap. The plug is disposed in a predefined position with respect to the carrier plate, and is connected to the carrier plate, or forms a single building block with the carrier plate.

A disadvantage of such a contact unit embodiment is that the relative position of the plug to the carrier plate is fixed, therefore, according to the space available in the motor a resulting change in position of the plug may be needed and a new construction of the carrier plate would be required. This need to construct a new carrier plate leads to additional construction and manufacturing costs in an otherwise identical embodiment of the throttle flap support.

It is therefore an object of the present invention to provide a contact unit in which the relative position of the plug to the contact unit can be embodied differently, according to the demands of purchasers, without having to substantially change the construction, or, for example, the manufacturing process.

SUMMARY OF THE INVENTION

The objects, in accordance with the present invention, are solved in that the contact plate and the inner portion of the plug are plastic components produced together in a single injection step and are merely connected over the flexible conducting tracks. Whereby the contact plate is always connected to the housing of the throttle flap support in the same manner, and the plug can, according to available construction space, be positioned either axially or radially to the throttle flap shaft at varying positions on the cover or even on the throttle support housing.

In a preferred embodiment, the opening for passing through the connection plug has a molding seal formed thereon that is connected in a form fitting manner with the cover or the housing. The molding seal can, for example, be injected onto the cover so that assembly is facilitated and a reliable seal is secured.

In a preferred embodiment, the outer portion of the plug is fastened onto the inner portion of the plug, preferably over a clip connection, whereby the molded seal is disposed between the inner portion and the outer portion. One such connection is simply, for example over two clamps or clips, wherein the clamps or clips press the inner portion of the plug to the outside against the housing provided with the seal or with the cover provided with the seal, wherein the outer portion of the plug can be clipped by means of these clips onto the inner portion of the plug for assembly. In this manner, a secure and reliable connection is afforded without additional building components.

In a preferred embodiment, the outer portion of the plug comprises an axial collar that corresponds with a flange surface of the inner portion of the plug in such a manner that, when assembled, the molded seal between the axial collar and the flange surface is elastically deformed, whereby a tighter seal of the inner space is obtained with respect to the atmosphere.

One such contact unit allows the of the position of the plug with respect to the housing, or with respect to the cover, to be adapted to spatial conditions so that a more flexible application is possible. By means of this embodiment, production and construction costs are saved by a simpler construction and assembly.

Thus, in accordance with the objects of the present invention, a contact unit for assembling with a throttle flap support of an internal combustion machine is provided, and includes: (a) a contact plate fastenable to a housing of a throttle flap support, wherein the contact plate comprises: i. bore holes formed therein, wherein a first bore hole is disposed for taking up a throttle flap shaft and a second bore hole is disposed for taking up a drive shaft when the contact unit is assembled with the throttle flap support of the internal combustion machine; and ii. first conductor tracks disposed to provide a first electrical connection between contact flags of a drive unit and a connection plug and a second electrical connection between contacts of a position sensor and the connection plug; (b) a cover defining a space sealed by the cover, wherein the contact plate is arranged in the space or delineates the space on one side; and (c) the plug is attached to the cover and comprises a plug inner portion and a plug outer portion, wherein the inner portion extends through an opening formed in the cover, or in the housing of the throttle flap support, and abuts a bordering inner wall of the cover with a flange surface, and is fastened in this position by a second connection to the outer portion of the plug, wherein the contact plate and the plug inner portion are plastic parts produced together in an injection process so the contact plate and the plug inner portion are only connected to one another by second flexible conductor tracks.

Further objects, features and advantages of the present invention will become apparent from the Detailed Description of Illustrative Embodiments, which follows, when considered together with the attached drawings.

BRIEF DESCRIPTION OF THE DRAWINGS

A contact unit according to the present invention is shown in the drawings and will be described as follows.

DETAILED DESCRIPTION OF ILLUSTRATIVE EMBODIMENT

Figure 1:
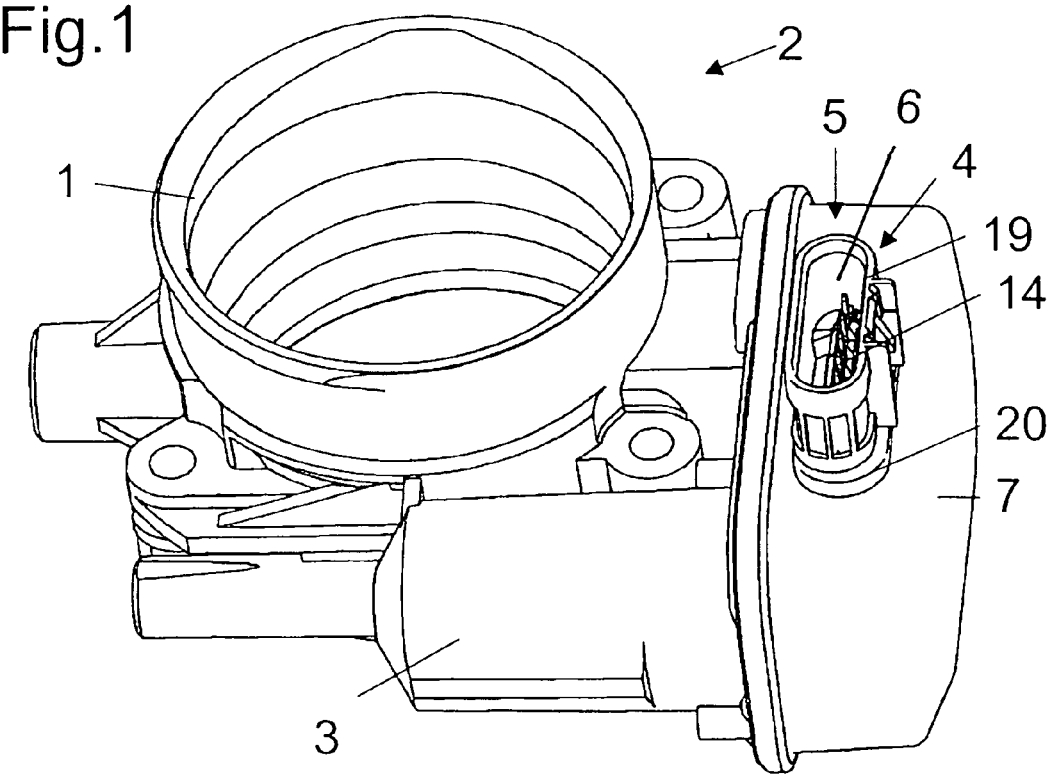
FIG. 1 shows, in a perspective view, a contact unit according to the present invention in the state assembled on a throttle flap support.

In FIG. 1, a contact unit in accordance with the present invention is illustrated assembled on a throttle flap support 2. The housing 1 of a throttle flap support 2 is shown, upon which a throttle flap (not shown) would be arranged so as to be rotatable by means of a drive unit and a set of gears. The housing 1 of the throttle flap support 2 comprises a receptacle 3 for an electromotor as well as corresponding journal positions for the throttle flap shaft. The electrical contact for controlling the throttle flap is effectuated over a plug 4, which is a portion of the contact unit 5 according to the present invention. The contact unit 5, in accordance with the present invention, is disposed in a space 6 along with a gear unit (not shown). The space 6 is sealed by, and defined by, a cover 7. In the present embodiment, the plug 4 protrudes out from the cover 7.

Figure 2:
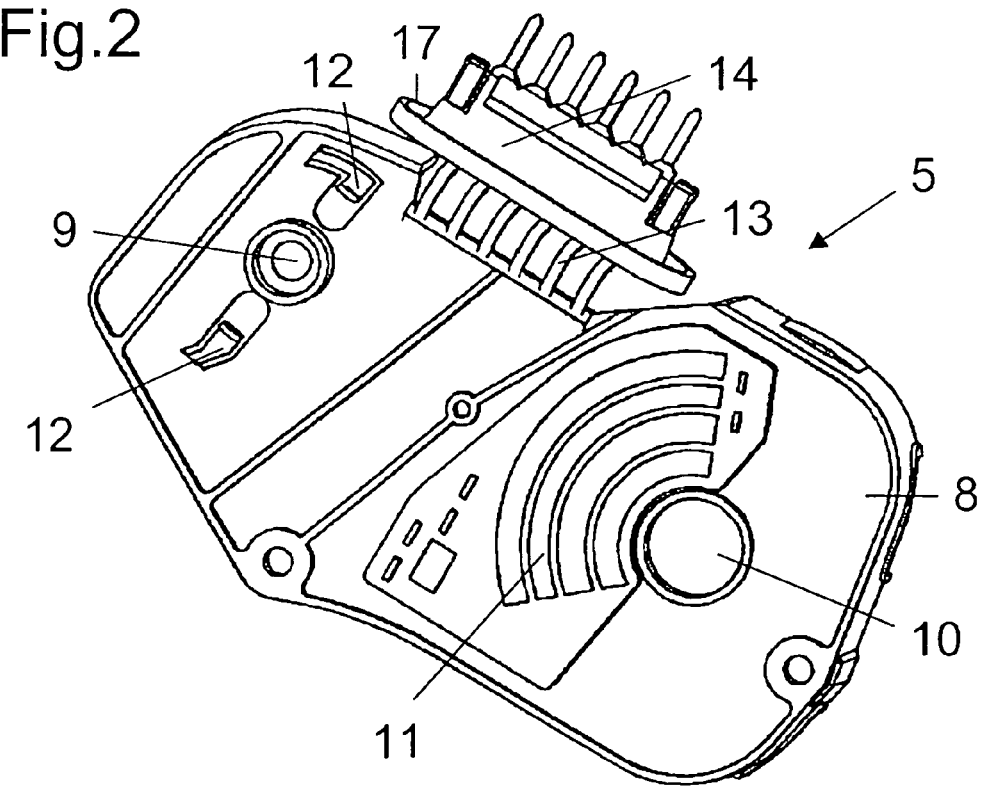
FIG. 2 shows, in a perspective view, a contact plate with a plug inner portion according to the contact unit of the present invention.

The contact unit 5, according to the present invention, is also shown in FIG. 2. Contact unit 5 comprises a contact plate 8, in which two bore holes 9, 10 are disposed (i.e., formed therethrough). In the assembled state, the drive shaft of the motor extends through bore hole 10 and the throttle flap shaft extends through bore hole 9. These two shafts (i.e., the drive shaft and the throttle flap shaft) are connected to one another in a known manner by a set of gears not explicitly illustrated.

Slider tracks 11 of a potentiometer, which serves as a position sensor, are disposed on the contact plate 8. It should be noted that other sensors, for example, non-moving position sensors, can be disposed on the contact plate 8. In particular, the electrical contact between the slider tracks 11 of the potentiometer, as well as between the contact flags 12 for contacting with the electromotor (not shown) and the connection plug 4 is conducted over conductor tracks 13 injected into the contact plate 8. The contact flags 12 are arranged, during assembly of the contact plate 8 onto the throttle flap support 2, to provide the electrical connection to the corresponding contact flags of the electromotor, which are in spring contact with the contact flags 12. The conductor tracks 13, which lead out of the contact plate 8, are fixed to one another in a forgiving manner by a plug inner portion 14. The plug inner portion 14 is produced in an injection process with contact plate 8. It is clear that the electrical connection between the contact plate 8 and the plug inner portion 14 is only established through the conductor tracks 13. Therefore, the later assembly position of the plug 4, with respect to the throttle flap support 2, and the shape of the plug 4 can be matched with purchaser requirements without having to change the shape of the contact plate 8.

Figure 3:
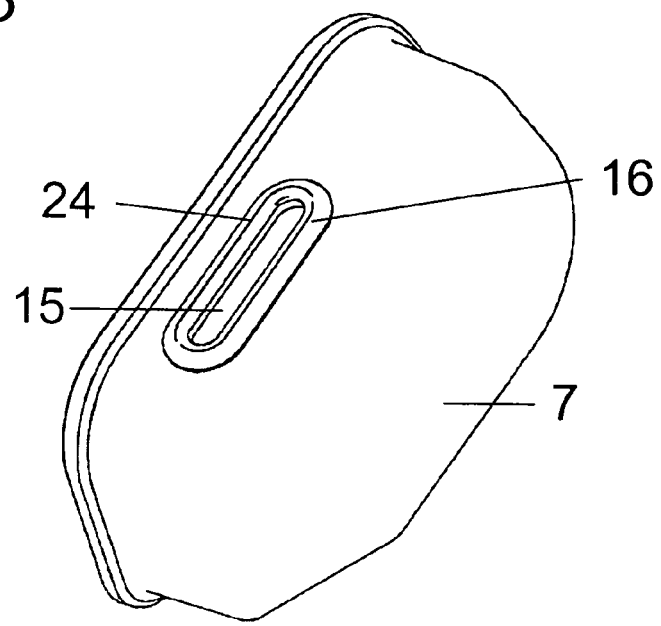
FIG. 3 shows a perspective view of a cover of the contact unit with a molded seal.
Figure 4:
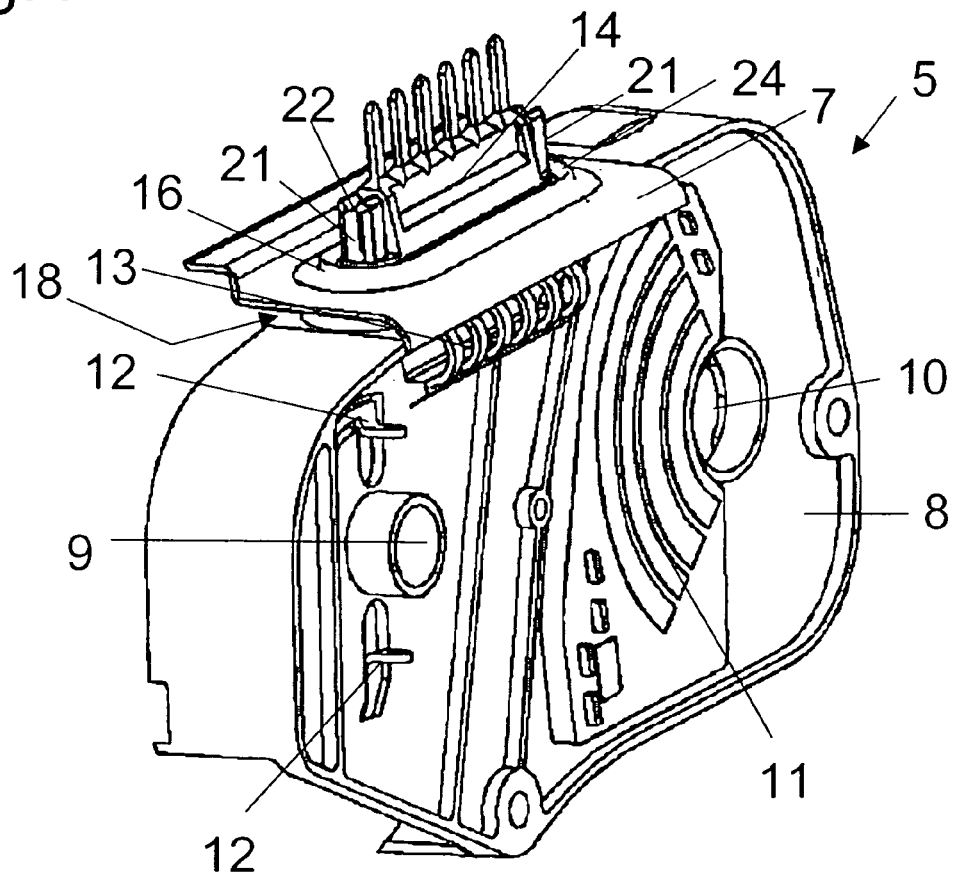
FIG. 4 shows a perspective view of the contact plate with a plug inner portion with a cut out of the cover having the molded seal.
Figure 5:
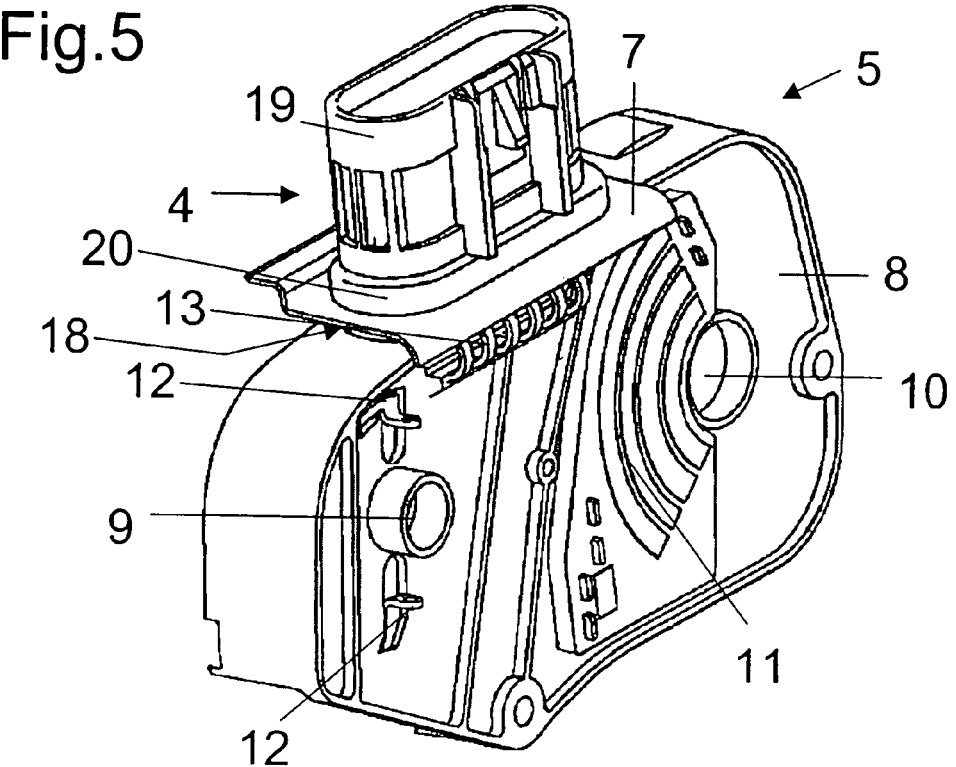
FIG. 5 shows a representation according to FIG. 4 with a plug outer portion assembled thereon.

FIG. 3 shows the cover 7 in cut-away view. Cover 7 comprises an opening 15 formed therein through which the plug inner portion 14 extends after assembly as shown in FIG. 4. The opening 15 is bordered by a molding seal 16 that is form-fittingly fastened to at least the cover 7. It is also possible to embody the molding seal 16 as an injection molded part of the cover 7.

The position of the plug inner portion 14 on the cover 7 is shown in FIG. 4. The plug inner portion 14 is positioned on the cover 7 using a flange surface 17 of the plug inner portion so a seal to the outside results with the molding seal 16 during assembly. In other words, the flange surface 17 of the plug inner portion 14 contacts the molding seal 16 of cover 7 so as to form a seal that seals the space 6 from the region outside of the cover 7.

The connection between the plug inner portion 14 and the plug outer portion 19 is realized through a clip connection. The clip connection is provided by bosses 21, as shown in FIG. 4, which correspond by means of hook elements 22 with corresponding recesses in plug outer portion 19 so that a form fitting connection results.

Figure 6:
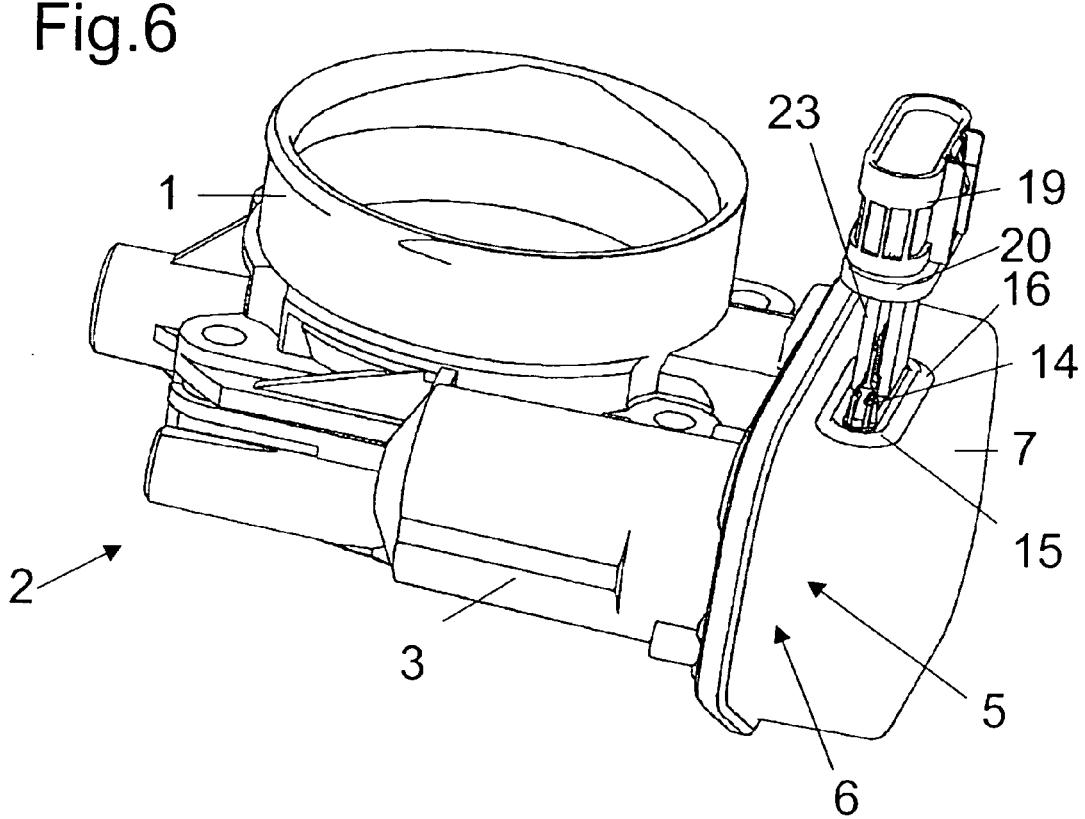
FIG. 6 also shows, in perspective view, the assembly of the plug outer portion by means of a tool used therefor.

FIG. 6 shows how the assembly of the plug outer portion 19 on the plug inner portion 14 can be carried out. The plug inner portion 14, pressed from the inside onto the cover 7, is held in place from the outside by a corresponding assembly device 23 until the clip connection engages. The molding seal 16 is so embodied that around the entire circumference of the molding seal 16 a web 24 is provided that corresponds with the axial collar 20 of the plug outer portion 19, which achieves a subsequent improvement of the seal.

It is clear that, by this construction, the electrical connection between the contact plate 8 and the plug inner portion 14 only results over the conductor tracks 13, that the position of the plug on the cover is freely selectable and can be adapted to the spatial requirements of the motor. Furthermore, it is possible, within the scope of the present invention, to put the opening 15 not in the cover 7, but, for example, in the housing 1 of the throttle flap support 2, without changing the assembly.

The present embodiment is therefore suited to adopting to plug geometry, as well as to the position of the plug on the throttle flap support or the cover of the gear unit, in accordance with corresponding purchaser requirements, without having to adapt the injection molds of the contact plates. Consequently, significant manufacturing and development costs are thereby saved.

It is evident that a contact unit, in accordance with the present invention, can be used for other adjustment devices without departing from the scope of the present invention. It is also clear that the connection between the two plug portions 14, 19 can be produced in a different manner, such as by screwing, for example. The contact to the motor selected in this embodiment can also be realized in a brush motor by a particular brush position onto the contact plate.

While the present invention has been described with reference to certain illustrative embodiments, one of ordinary skill in the art will recognize that additions, deletions, substitutions, modifications, and improvements can be made while remaining within the spirit and scope of the present invention as defined by the appended claims.

What is claimed is:

1. A contact unit for assembling with a throttle flap support of an internal combustion machine, comprising:
   (a) a contact plate fastenable to a housing of the throttle flap support, wherein the contact plate comprises:
      i. bore holes formed therein, wherein a first bore hole is disposed for taking up a throttle flap shaft and a second bore hole is disposed for taking up a drive shaft when the contact unit is assembled with the throttle flap support of the internal combustion machine; and
      ii. first conductor tracks disposed to provide a first electrical connection between contact flags of a drive unit and a connection plug and a second electrical connection between contacts of a position sensor and the connection plug;
   (b) a cover defining a space sealed by the cover, wherein the contact plate is arranged in the space or delineates the space on one side; and
   (c) wherein the connection plug is attached to the cover and comprises a plug inner portion and a plug outer portion, wherein the inner portion extends through an opening formed in the cover, or in the housing of the throttle flap support, and abuts a bordering inner wall of the cover with a flange surface, and is fastened in this position by a second connection to the outer portion of the plug, wherein the contact plate and the plug inner portion are plastic parts produced together in an injection process so the contact plate and the plug inner portion are only connected to one another by second flexible conductor tracks.

2. A contact unit according to claim 1, wherein a molding seal is positioned on the opening and the inner portion of the connection plug passes through the opening and provides a form fitting connection with at least the cover or the housing.

3. A contact unit according to claim 2, wherein the plug outer portion is connected with the plug inner portion by the second connection provided as a clip connection, and the molding seal is positioned between the inner portion and the outer portion of the plug.

4. A contact unit according to claim 1, wherein the plug outer portion has an axial collar corresponding with the flange surface of the plug inner portion so that a molding seal disposed between the axial collar and the flange surface is elastically deformed in the assembled state.

5. A contact unit according to claim 2, wherein the plug outer portion has an axial collar corresponding with the flange surface of the plug inner portion so the molding seal is disposed between the axial collar and the flange surface and is elastically deformed in the assembled state.

6. A contact unit according to claim 3, wherein the plug outer portion has an axial collar corresponding with the flange surface of the plug inner portion so the molding seal is disposed between the axial collar and the flange surface and is elastically deformed in the assembled state.

* * * * *